United States Patent
Je et al.

(10) Patent No.: US 9,863,642 B2
(45) Date of Patent: Jan. 9, 2018

(54) CONTROL PANEL AND METHOD OF ASSEMBLING THE SAME AND COOKING APPLIANCE HAVING THE SAME

(71) Applicant: SAMSUNG ELECTRONICS CO., LTD., Suwon-si, Gyeonggi-do (KR)

(72) Inventors: Ji Woon Je, Suwon-si (KR); Han Seong Kang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 568 days.

(21) Appl. No.: 14/571,791

(22) Filed: Dec. 16, 2014

(65) Prior Publication Data

US 2015/0192303 A1 Jul. 9, 2015

(30) Foreign Application Priority Data

Jan. 7, 2014 (KR) .................. 10-2014-0002009

(51) Int. Cl.
*F24C 7/08* (2006.01)

(52) U.S. Cl.
CPC .......... *F24C 7/082* (2013.01); *Y10T 29/49826* (2015.01); *Y10T 403/52* (2015.01); *Y10T 403/595* (2015.01)

(58) Field of Classification Search
CPC ...... F24C 15/007; F24C 15/022; F24C 15/36; F24C 15/08; F24C 15/10; F24C 5/16; F24C 7/08; F24C 7/082; F24C 3/12; F24C 3/124; F24C 3/126
See application file for complete search history.

(56) References Cited

U.S. PATENT DOCUMENTS

| | | | | | |
|---|---|---|---|---|---|
| 2,059,735 | A * | 11/1936 | Kennedy | ................. | F24C 3/124 126/332 |
| 3,729,615 | A * | 4/1973 | Harris | .................. | H01H 43/125 219/486 |
| 4,323,764 | A * | 4/1982 | Willson | ..................... | F24C 7/08 219/490 |
| 4,869,231 | A * | 9/1989 | Rice | ........................ | F24C 15/10 126/211 |
| 4,922,888 | A * | 5/1990 | Bryan | ..................... | F24C 15/36 126/42 |
| 4,960,297 | A * | 10/1990 | Bouse | ..................... | E05C 3/162 126/197 |
| 5,158,065 | A * | 10/1992 | Lee | ......................... | F24C 3/124 126/21 R |

(Continued)

FOREIGN PATENT DOCUMENTS

| | | | | |
|---|---|---|---|---|
| DE | GB 1157790 A * | 7/1969 | .............. | F24C 7/082 |
| KR | 20-2000-0013721 | 7/2000 | | |
| KR | 10-2003-0088088 | 11/2003 | | |

*Primary Examiner* — Daniel Wiley
(74) *Attorney, Agent, or Firm* — Staas & Halsey LLP (57) ABSTRACT

A cooking appliance including a body provided with a heating part, a control panel detachably provided at the body, and a coupling unit configured to allow the control panel to come into close contact with the body. The coupling unit includes a first lever rotatably provided at an inner side of the control panel and is configured to receive an external force outside the control panel. The coupling unit also includes a second lever provided in between the control panel and the body to allow the control panel to come into close contact with the body while interlocked with an operation of the first lever.

24 Claims, 7 Drawing Sheets

(56) References Cited

U.S. PATENT DOCUMENTS

| | | | | |
|---|---|---|---|---|
| 5,419,305 A * | 5/1995 | Hanley | F24C 15/022 | 126/197 |
| 5,473,807 A * | 12/1995 | Tupa | A47L 15/42 | 29/525.01 |
| 5,611,610 A * | 3/1997 | Katz | D06F 39/12 | 312/263 |
| 5,653,221 A * | 8/1997 | Luken | F24C 7/082 | 126/299 C |
| 6,035,848 A * | 3/2000 | Ray | F24C 15/022 | 126/194 |
| 6,712,066 B1 * | 3/2004 | Atkinson | F24C 7/082 | 126/211 |
| 6,828,532 B2 * | 12/2004 | Han | H05B 6/6417 | 126/197 |
| 6,930,284 B2 * | 8/2005 | Kang | F24C 15/022 | 126/197 |
| 7,401,610 B1 * | 7/2008 | Cherry | F24C 15/36 | 126/211 |
| 7,895,998 B2 * | 3/2011 | Lee | E05B 47/0002 | 126/194 |
| 8,051,849 B2 * | 11/2011 | Albizuri | A47J 37/0786 | 126/19 R |
| 8,420,988 B2 * | 4/2013 | Geiger | F24C 15/10 | 219/451.1 |
| 8,726,791 B2 * | 5/2014 | Adamczak | A47J 27/04 | 126/20 |
| 8,844,514 B2 * | 9/2014 | Steurer | E05B 47/02 | 126/197 |
| 9,103,553 B2 * | 8/2015 | Daughtridge, Jr. | F24C 3/124 | |
| 9,395,093 B2 * | 7/2016 | Yu | F24C 15/36 | |
| 2007/0193572 A1 * | 8/2007 | Lee | E05F 1/1261 | 126/194 |
| 2007/0296224 A1 * | 12/2007 | Courter | E05B 17/0029 | 292/109 |
| 2016/0187000 A1 * | 6/2016 | Jang | F24C 3/085 | 126/39 E |
| 2016/0320067 A1 * | 11/2016 | Dachs | A47L 15/4293 | |
| 2016/0334113 A1 * | 11/2016 | Lee | F24C 15/08 | |

\* cited by examiner

CONTROL PANEL AND METHOD OF ASSEMBLING THE SAME AND COOKING APPLIANCE HAVING THE SAME

CROSS-REFERENCE TO RELATED APPLICATIONS

This application claims the benefit of the Korean Patent Application No. 10-2014-0002009, filed on Jan. 7, 2014, in the Korean Intellectual Property Office, the disclosure of which is incorporated herein by reference.

BACKGROUND

1. Field

Embodiments of the present disclosure relate to a control panel and a cooking appliance having the same, and more particularly, a control panel provided with an improved coupling structure and a cooking appliance having the same 2. Description of the Related Art The present disclosure is related to a control panel and a cooking appliance having the same. The cooking appliance may be provided in various types thereof, and an oven range provided in the form of an oven and a cook top coupled to each other will be used as an example.

The oven range is provided with a body having the shape of a cabinet, and the oven is provided at an inside the body, while the cook top having at least one heating part is provided at an upper portion of the body. As a source of energy to heat food substance, an electricity or a gas is used.

In a case of the oven range, a control panel is provided at a front of the body, that is, at an approximately upper side of an oven door, or at an upper portion of the body.

The control panel is referred to as a user interface provided with a plurality of buttons or key pads configured such that a user may be able to set a desired cooking mode or set various conditions needed for cooking. The control panel as such may include a display apparatus configured to check a cooking mode, cooking condition, or a status of cooking that is presently set.

The control panel may be efficient while detachably provided at the body as to receive maintenance or repair. However, in a case when a gap is formed in between the control panel and the body, the food material being cooked at the cook top may be introduced, and thereby a malfunction of the control panel may be occurred.

SUMMARY

Therefore, it is an aspect of the present disclosure to provide a control panel capable of improving an adhesion, and a cooking appliance having the same.

Additional aspects of the disclosure will be set forth in part in the description which follows and, in part, will be obvious from the description, or may be learned by practice of the disclosure.

In accordance with an aspect of the present disclosure, a cooking appliance includes a body and a coupling unit. The body may be provided with a heating part, a control panel detachably provided at the body. The coupling unit may be configured to allow the control panel to come into close contact with the body, wherein the coupling unit may include a first lever rotatably provided at an inner side of the control panel and configured to receive an external force outside the control panel, and a second lever provided in between the control panel and the body to allow the control panel to come into close contact with the body while interlocked with an operation of the first lever.

The first lever may include a pushing part exposed to an outside the control panel to receive an external force, and the first lever may move between a first position at which the pushing part is spaced apart from the body and a second position at which the pushing part comes into close contact with the body after being rotated from the first position, and when the first lever moves from the first position to the second position, the second lever may press the control panel toward the body while interlocked with the first lever.

When the first lever is at the second position, an operation of the second lever may be restricted by the first lever in a state that the second level presses the control panel toward the body.

When the first lever is at the second position, one end portion of the second lever may press the control panel toward the body, while the other end portion of the second lever may make contact with the first lever such that an operation of the second lever is restricted.

The first lever may include a pushing part disposed at one end portion of the first lever to be exposed to an outside the control panel, and the second lever may include a pressing part configured to press the control panel toward the body in-between of the control panel and the body, and a direction of an external force being applied to the pushing part and a direction of the pressing of the pressing part may be identical to each other.

The pushing part may be provided to be fixed to the body when the first lever is at the second position.

The first lever may include a pushing part exposed to an outside the control panel, and a first driving force delivering part provided in between the control panel and the body, to deliver a driving force to the second lever by being moved in a direction opposite to a movement direction of the pushing part by use of a first rotating shaft provided in between the pushing part and the first driving force delivering part.

The second lever comprises a second driving force delivery part to receive a driving force through the first driving force delivering part, and a pressing part allowing the control panel to come into close contact with the body by being moved in a direction opposite to a movement direction of the second driving force delivering part by use of a second rotating shaft provided in between the second driving force delivering part and the pressing part.

The first rotating shaft and the second rotating shaft may be provided to be parallel to each other.

The first lever and the second lever may rotate in opposite directions with respect to each other.

The first driving force delivering part may be formed to be thicker than the first lever adjacent to the first driving force delivering part.

The pushing part may be bentedly formed at one end portion of the first lever so as to make a surface contact with the body.

The cooking appliance may further include an opening through which food to be cooked is introduced or withdrawn, and a door to open and close the opening, wherein the control panel is disposed at an upper side of the door.

The pushing part may be disposed to be exposed beyond a lower side of the control panel and covered by the door at the time of when the opening is closed by the door.

The cooking appliance may further include a sealing member provided in between the body and the control panel while surrounding along the control panel.

The control panel may include a panel body, and a temporary coupling protrusion bentedly formed at the panel body to be parallel to an outer surface of a side of the control panel of the body, wherein the second lever presses the temporary coupling protrusion.

In accordance with an aspect of the present disclosure, a cooking appliance includes a body, a control panel and a coupling unit. The body may have an opening through which food to be cooked is introduced or withdrawn, and a door configured to open and close the opening. The control panel may be detachably provided at the body. The coupling unit may be configured to allow the control panel to come into close contact with the body. The coupling unit may include a pushing unit and a pressing unit. The pushing unit may have a pushing part exposed to an outside the control panel to receive an external force, the pushing unit configured to operate by the external force delivered to the pushing part. The pressing unit may be provided at an inside the control panel, and configured to press the control panel toward the body while interlocked with the pushing unit.

The pushing part may be disposed to be prevented from being exposed to an outside by the door at the time of when the door closes the opening.

The pushing unit may move between a first position at which the pushing part is spaced apart from the body and a second position at which the pushing part comes into close contact with the body after rotated from the first position. When the pushing unit moves from the first position to the second position, the pressing unit may press the control panel toward the body while interlocked with the pushing unit.

The pressing unit may include a pressing part configured to allow the control panel to be pressed toward the body in-between of the control panel and the body. The pushing part and the pressing part may be moved in the same direction.

The pushing part may further include a coupling hole coupled to the body.

In accordance with another embodiment of the present disclosure, a control panel assembling method of coupling a control panel to a body provided with a heating part includes coupling a first lever and a second lever to the body such that the first level and the second lever are interlocked with each other; temporary coupling the control panel to cover the first lever and the second lever; and allowing the control panel to come into close contact with the body by pressing a pushing part of the first lever.

The pushing part may be exposed to an outside the control panel.

The first lever and the second lever may be rotated in opposite directions with respect to each other.

According to the control panel and the cooking appliance having the same of the present disclosure, the adhesion of the control panel is improved, so that a lifespan of the control panel is improved and a sanitary cooking environment is provided.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout.

Figure 1:
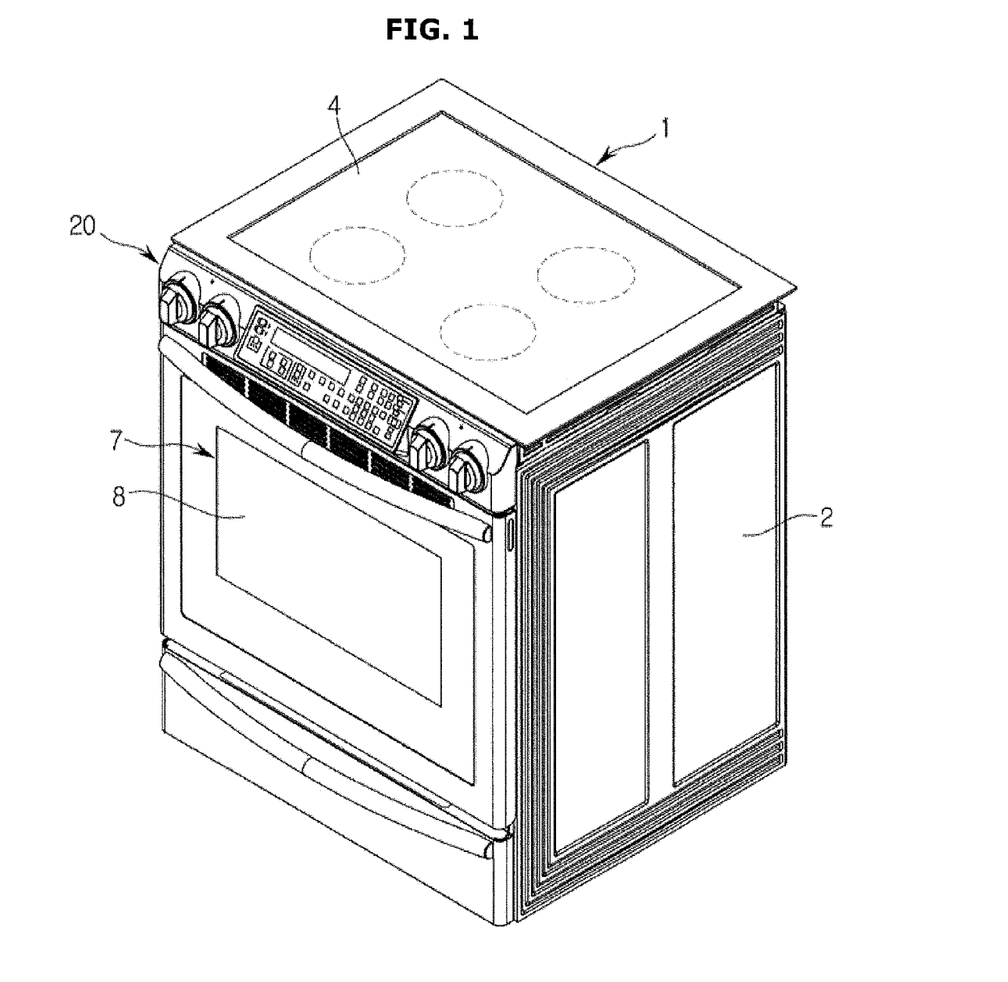
FIG. 1 is a perspective view of a cooking appliance in accordance with one embodiment of the present disclosure.

FIG. 1 is a perspective view of a cooking appliance in accordance with one embodiment of the present disclosure.

Referring to FIG. 1, an oven 1, as a cooking appliance at which the aspect of the present disclosure is applied, is provided with a cavity (not shown) formed at an inside thereto, and is provided at an upper side thereof with a body 2 having a cook top 4, a control panel 20 at which the operations of the oven 2 are manipulated, and a door 7 configured to selectively open/close a front surface of the cavity (not shown). Then, a central portion of the door 7 is provided with a window 8 formed thereto through which the cooking status of the food material being accommodated at an inside the cavity (not shown) is observed by use of the naked eye.

As suggested on FIG. 1, the descriptions of the aspect of the present disclosure are being provided by using an example of an integrated-type oven at which the cavity (not shown) and the cook top 4 are simultaneously formed. However, the cooking appliance is not limited hereto, and an apparatus provided with a control panel mounted thereto may be referred to as the cooking appliance.

The control panel 20 is detachably provided with respect to the body 2. In a case when the control panel 20 is integrally provided with respect to the body 2, a work accompanying a disassembly of the entire cooking appliance is needed as to perform maintenance or repair of the control panel 20, and thus the control panel 20 is detachably provided with respect to the body 2 as to easily perform maintenance or repair of the control panel 20.

Figure 2:
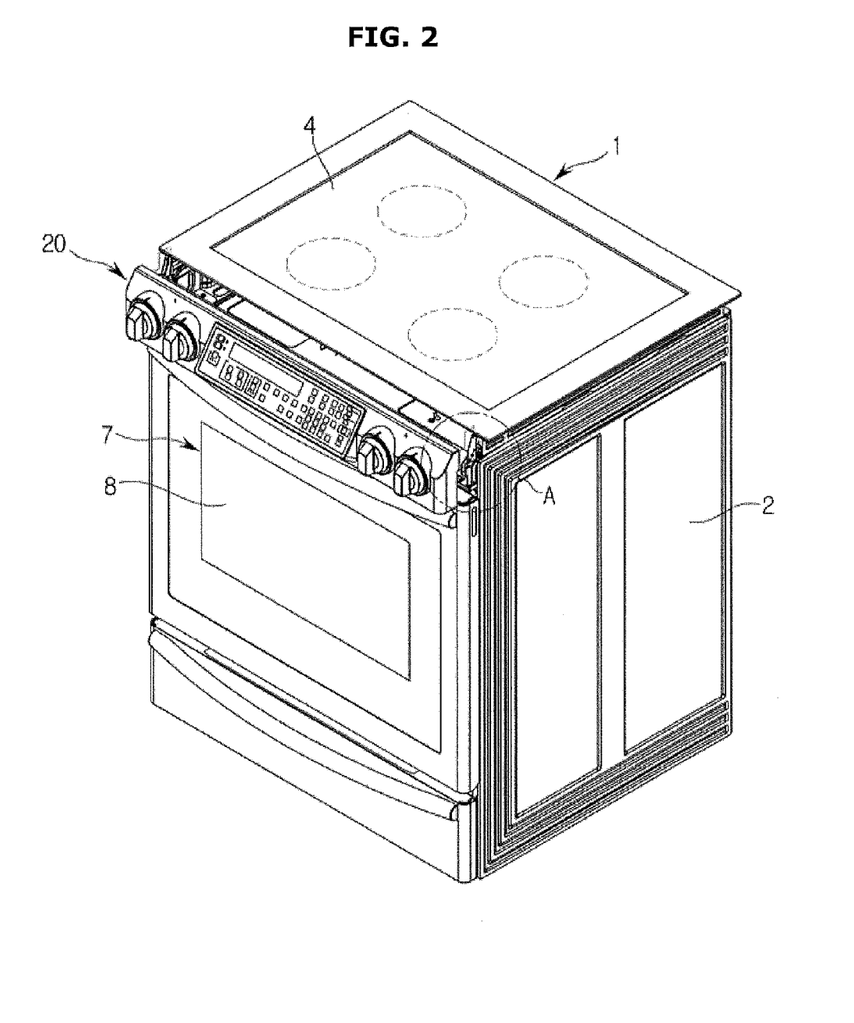
FIG. 2 is a perspective view showing a control panel detached from the cooking appliance in accordance with one embodiment of the present disclosure.

FIG. 2 is a perspective view showing the control panel detached from the cooking appliance in accordance with one embodiment of the present disclosure.

The control panel 20 may be detachably provided with respect to the body 2. In a case when the control panel 20 is integrally formed with respect to the body 2 of the cooking appliance, a disassembly of the entire cooking appliance is needed as to perform maintenance or repair of the control panel 20. Thus, by detachably providing the control panel 20 with respect to the body 2, the maintenance or repair of the control panel 20 may be easily performed.

A temporary coupling protrusion 22 (see FIGS. 5-7) is formed at an inside the control panel 20, and a temporary coupling groove 24 (see FIGS. 4-7) may be formed as to correspond to the temporary coupling protrusion 22. As the temporary coupling protrusion 22 is correspondingly coupled into the temporary coupling groove 24 of the body 2, the control panel 20 may be provided as to be mounted at the body 2. In the present embodiment, the control panel 20 and the body 2 are coupled into each other as the temporary coupling protrusion 22 and the temporary coupling groove 24 are formed, but is not limited hereto, and any structure having the control panel 20 and the body 2 coupled with respect to each other may be considered desirable.

Figure 3:
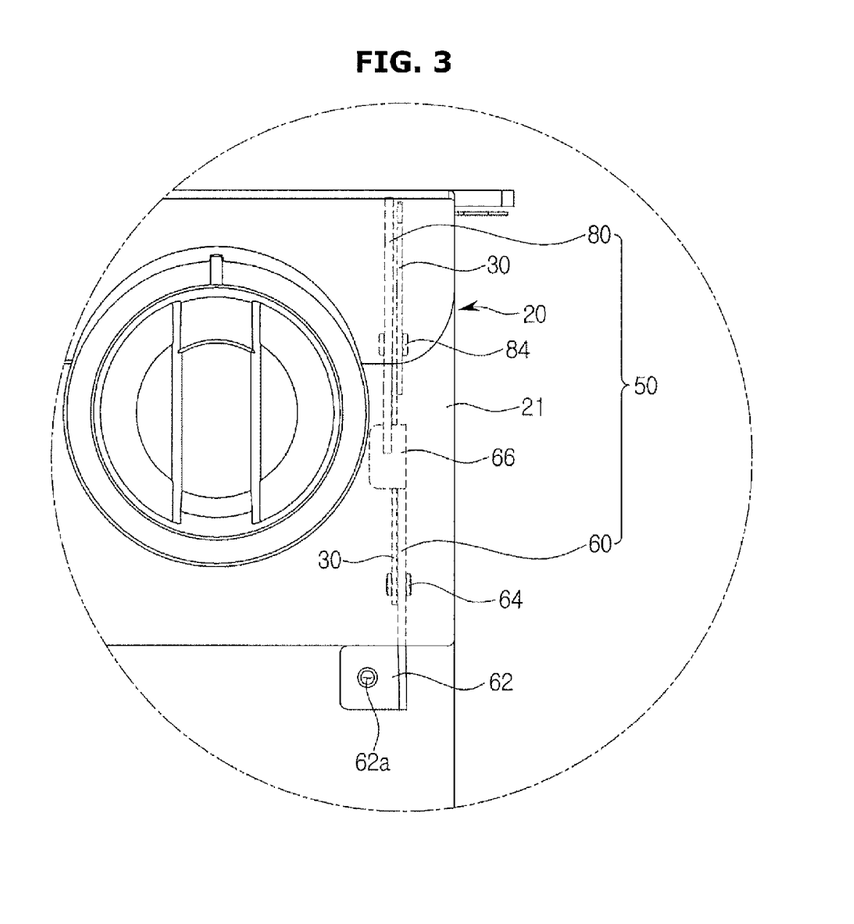
FIG. 3 is a frontal view of a coupling unit of the cooking appliance in accordance with one embodiment of the present disclosure being disposed.
Figure 4:
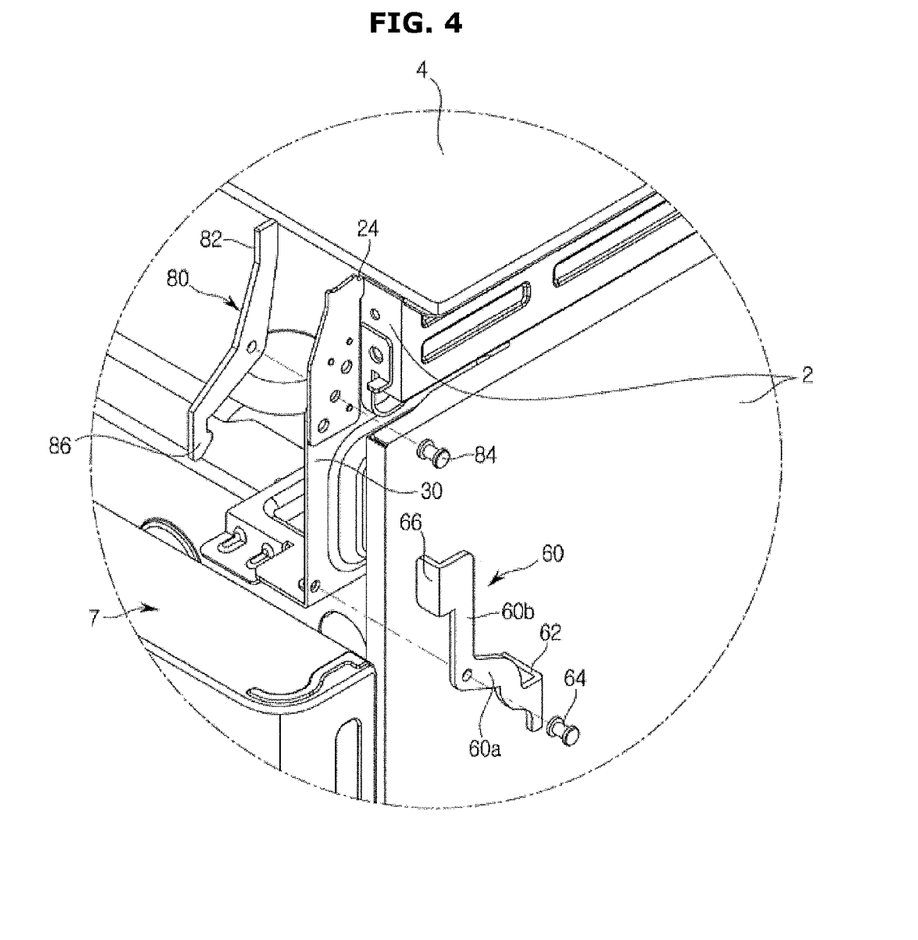
FIG. 4 is an exploded perspective view A of FIG. 2 illustrating parts of the cooking appliance in accordance with one embodiment of the present disclosure.

FIG. 3 is a frontal view of a coupling unit of the cooking appliance in accordance with one embodiment of the present disclosure being disposed, and FIG. 4 is an exploded perspective view of a portion A of a structure of the cooking appliance of FIG. 2 in accordance with one embodiment of the present disclosure.

Even when the control panel 20 temporarily coupled into with respect to the body 2, in a case when a gap is formed in between the control panel 20 and the body 2, food material may flow during a cooking process, and a malfunction of the control panel 20 or the cooking appliance may occur. A coupling unit 50 is provided at the control panel 20 as to prevent the above by allowing the control panel 20 to come into close contact with the body 2.

The coupling unit 50 is provided such that the control panel 20 comes into close contact with the body 2.

In detail, a coupling unit settling part 30 at which the coupling unit 50 is settled toward the control panel 20 may be provided at the body 2. A first rotating shaft 64 and a second rotating shaft 84 may be disposed at the coupling unit settling part 30 such that a first lever 60 and a second lever 80 may be rotated.

The close contact of the control panel 20 and the body 2 may be achieved through a direct screw coupling. However, the method as the above may not be seen aesthetically suitable, as a coupling portion is exposed to an outside, and in addition, in a case when the coupling portion is corroded, the detachment of the control panel 20 may be difficult. Thus, in the present disclosure, the coupling unit 50 is capable of allowing the control panel 20 to come into close contact with the body 2 while minimizing a portion being exposed to an outside is described.

The coupling unit 50 is prevented from being exposed to an outside, and is provided such that at least one portion of the coupling unit 50 is exposed to an outside to receive an external force, thereby allowing the control panel 20 to come into close contact with the body 2.

The coupling unit 50 may include the first lever 60 and the second lever 80.

The first lever 60 is provided with at least one portion thereof exposed to an outside the control panel 20, and is structured as to receive an external force from an outside.

The second lever 80 is provided in between the control panel 20 and the body 2 to allow the control panel 20 to come into close contact with the body 2 while interlocked with respect to the operations of the first lever 60.

The first lever 60 and the second lever 80 are provided so as to be rotated with respect to the body 2 while having the first rotating shaft 64 and the second rotating shaft 84, respectively. In detail, the first lever 60 and the second lever 80 are rotatably provided at the coupling unit settling part 30 that is provided at the body 2. The first rotating shaft 64 and the second rotating shaft 84 are provided as to be covered by the control panel 20, and may be provided as to be parallel to each other. That is, the first lever 60 and the second lever 80 are rotatably provided at an inside the control panel 20.

The first lever 60 is configured to move the second lever 80 by receiving an external force, and the second lever 80 allows the control panel 20 to come into close contact with the body 2 according to the operations of the first lever 60, and thus the first lever 60 and the second lever 80 may be referred to as a pushing unit and a pressing unit, respectively.

The first lever 60 may include a pushing part 62 provided as to receive an external force while exposed to an outside the control panel 20. The pushing part 62 is exposed to an outside the control panel 20 to receive an external force in a case when the control panel 20 is temporarily coupled to the body 2, so that the second lever 80 operates at an inside the control panel 20.

The first lever 60 is provided as to move a first position 'P1' (see FIGS. 5-7) at which the pushing part 62 is spaced apart from the body 2, and a second position 'P2' (see FIGS. 5-7) at which the pushing part 62 comes into close contact with the body 2 by rotating from the first position 'P1'. At the time of when the first lever 60 is moved from the first position 'P1' to the second position 'P2', the second lever 80 is provided as to press the control panel 20 to the body 2 while interlocked with the first lever 60.

Figure 5:
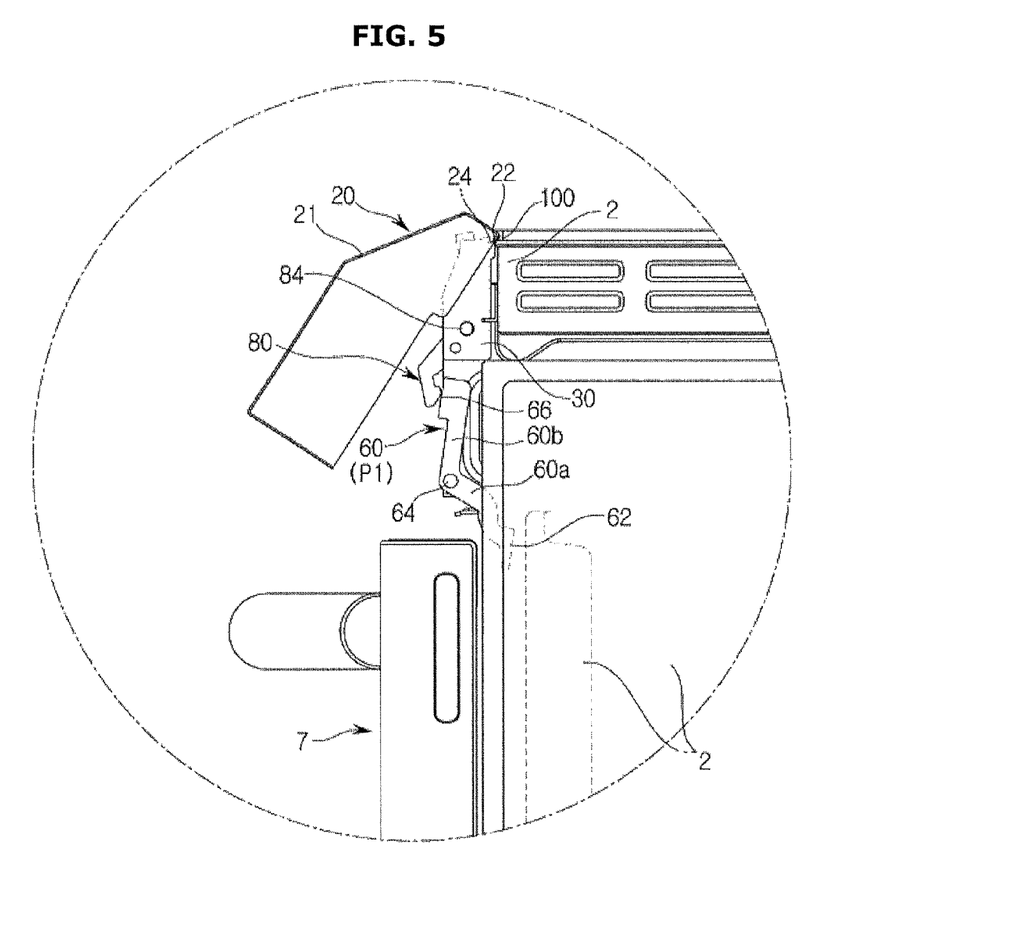
FIG. 5, FIG. 6, and FIG. 7 are drawings showing a process of assembling the cooking appliance in accordance with one embodiment of the present disclosure.
Figure 6:
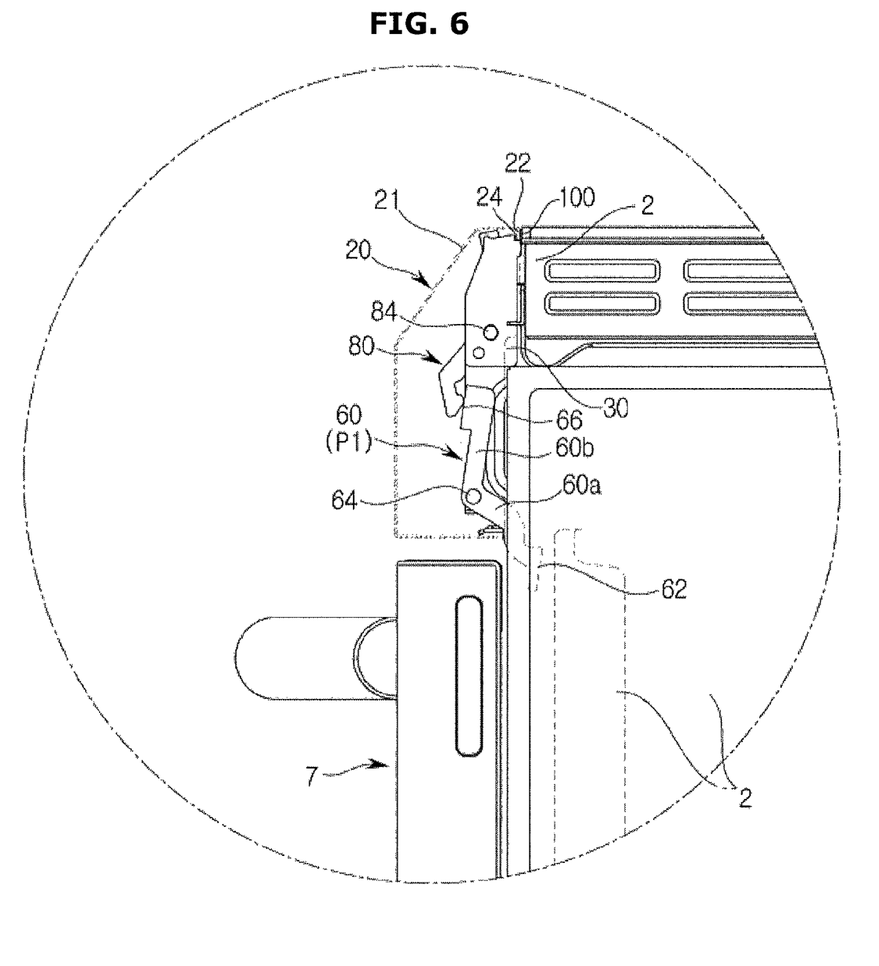
Figure 7:
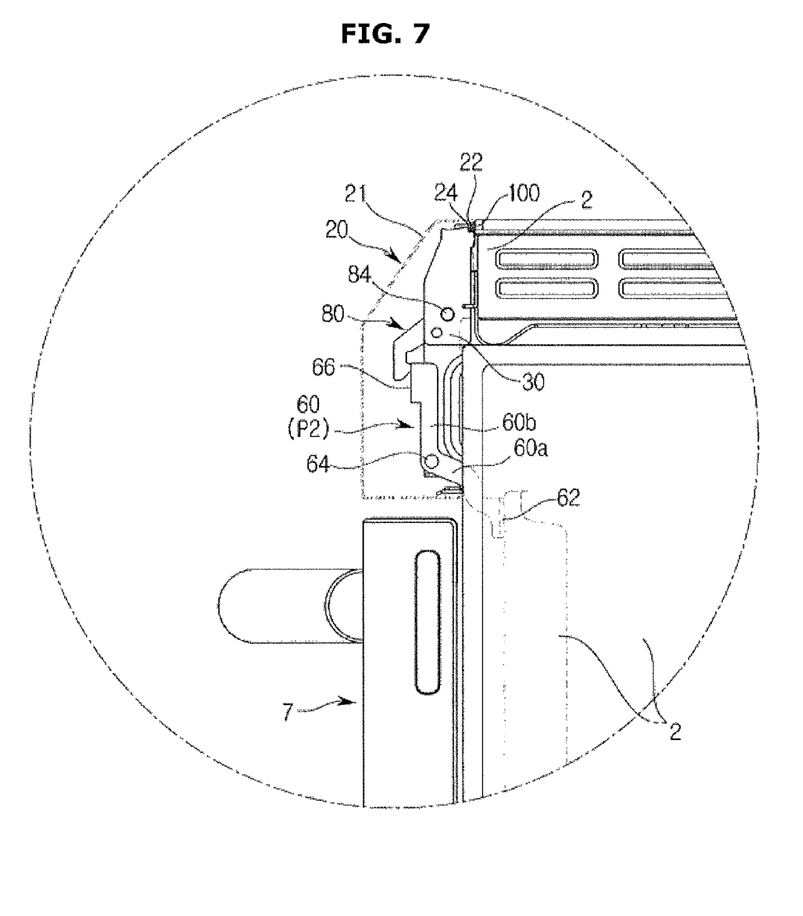

In addition, in a case when the first lever 60 is at the second position 'P2', the second lever 80 is provided as to be restricted in a state of pressing the control panel 20, and in a case when the first lever 60 is at the first position 'P1', the restriction on the second level 80 is released. That is, in a case when the first level 60 is at the second position 'P2', one end portion of the second lever 80 is configured to press the control panel 20 to the body 2, while the other end portion of the second lever 80 is provided as to make contact with the first lever 60 such that the operation of the second lever 80 is restricted.

The pushing part 62 is provided as to be fixed to the body 2 when the first lever 60 is at the second position 'P2'. A coupling hole 62a is provided at the pushing part 62, so that in a case when the first lever 60 is at the second position 'P2', the coupling hole 62a allows the pushing part 62 and the body 2 to be screw-coupled with respect to each other. In detail, the pushing part 62 is bentedly formed toward one side at one end portion of the first lever 60 as to be surface-contacted with the body 2, and the coupling hole 62a is formed at the pushing part 62 such that the pushing part 62 is coupled to the body 2. Through the structure as such, the first lever 60 is provided as to be stably coupled to the body 2 at the second position 'P2'. In the embodiment of the present disclosure, the screw-coupling is shown as one example, but is not limited hereto, and any structure provided with the pushing part 62 being coupled to the body 2 may be considered desirable.

When the pushing part 62 at the first lever 60 is pressed, the second lever 80 is provided to be moved while interlocked with respect to the rotations of the first lever 60. In detail, the first lever 60 includes a first driving force delivering part 66, and the second lever 80 includes a second driving force delivering part 86 making contact with the first driving force delivering part 66 and configured to receive a rotational force of the first lever 60.

The first driving force delivering part 66 may be bentedly formed from the first lever 60 as to widen the contact surface with respect to the second driving force delivering part 86. In detail, the first driving force delivering part 66 is bentedly formed toward one side at one end portion of the first lever 60 such that the second driving force delivering part 86 may stably receive a rotational force through the first driving force delivering part 66. From a different perspective, the first driving force delivering part 66 is formed thicker than the first lever 60 adjacent to the first driving force delivering part 66, to stably deliver a rotational force to the second driving force delivering part 86.

The first rotating shaft 64 is provided in between the first driving force delivering part 66 and the pushing part 62, and is provided such that the first driving force delivering part 66 may be moved in a direction opposite to the movement of the pushing part 62. That is, the pushing part 62 and the first driving force delivering part 66 are disposed opposite to each other with respect to the first rotating shaft 64, and thus, at the time of when the first lever 60 moves between the first position 'P1' and the second position 'P2', the pushing part 62 and the first driving force delivering part 66 move in opposite directions to each other.

The first lever 60 may be bentedly formed. In detail, a first pushing lever body 60a connecting the first rotating shaft 64 to the pushing part 62 and a second pushing lever body 60b connecting the first rotating shaft 64 to the first driving force delivering part 66 may be formed while forming a certain angle with respect to each other. In a case when the control panel 20 is mounted at the body 2, the control panel 20 may be protrudedly provided from the body 2, and through the structure as the above, a coupling portion is covered by a lower portion of the control panel 20, so that the control panel 20 may be coupled to the body 2 without exposing the coupling portion to an outside. In addition, the pushing part 62, which is being disposed as to be exposed beyond a lower side of the control panel 20, is provided as to be covered by the door 7 at the time when the door 7 is closed, so that the coupling portion may not be exposed to an outside for aesthetic purposes.

The second lever 80, as described above, is provided in between the control panel 20 and the body 2 as to allow the control panel 20 to come into close contact with the body 2 while interlocked with the operations of the first lever 60.

The second lever 80 may include a pressing part 82.

The pressing part 82 is provided at one end portion of the second lever 80, and is provided as to press the control panel 20 to the body 2 at the time of when the first lever 60 is moved from the first position 'P1' to the second position 'P2'. In detail, the control panel 20 may include the temporary coupling protrusion 22 that is bentedly formed at a panel body 21 of the control panel 20 in parallel to an outer surface of a side of the control panel 20 of the body 2. The pressing part 82, by pressing the temporary coupling protrusion 22 toward the body 2, may allow the control panel 20 to come into close contact with the body 2.

The direction of an external force applied to the pushing part 62 and the direction of a pressure applied to the control panel 20 of the pressing part 82 are provided to be identical to each other. The rotational direction of the first lever 60, and the rotational direction of the second lever 80, which is interlocked with respect to the first lever 60, are formed in opposite directions with respect to each other, and thus, the moving directions of the pushing part 62, which is provided at one end portion of the first lever 60, and the pressing part 82, which is provided at one end portion of the second lever 80, are provided to be identical to each other. Through the structure as the above, in a case when an external force is applied to the pushing part 62 by a user, the direction in which the external force is applied and the direction in which the pressing part 82 presses the control panel 20 to the body 2 are in accord with respect to each other, so that the controlling of the coupling unit 50 may be intuitively performed.

The second driving force delivering part 86, as described above, is formed as to receive a rotational force of the first lever 60 through the first driving force delivering part 66, and is provided as to deliver a rotational force to the second lever 70. The second rotating shaft 84 is provided in between the second driving force delivering part 86 and the pressing part 82, and the pressing part 82 is provided as to move in a direction opposite to the movement direction of the second driving force delivering part 86. That is, the second driving force delivering part 86 and the pressing part 82 are disposed opposite to each other with respect to the second rotating shaft 84, and thus the moving directions of the second driving force delivering part 86 and the pressing part 82 are provided to be opposite with respect to each other at the time of when the second lever 80 is rotated by being interlocked with the first lever 60.

A sealing member 100 (see FIGS. 5-7) may be provided in between the control panel 20 and the body 2. The sealing member 100 is provided as to further eliminate a gap in between the control panel 20 and the body 2, and is also provided as to seal the in-between of the control panel 20 and the body 2.

Hereinafter, an assembling method of the control panel 20 in accordance with the descriptions above and at the cooking appliance having the control panel 20 will be described.

FIG. 5, FIG. 6, and FIG. 7 are drawings showing operations of assembling processes of the cooking appliance in accordance with one embodiment of the present disclosure.

First, the control panel 20 is temporarily coupled to the body 2 (see FIG. 5). By coupling the temporary coupling protrusion 22 of the control panel 20 to the temporary coupling groove 24 of the body 2, the control panel 20 is mounted at the body 2.

Prior to the temporary coupling, the coupling unit 50 is coupled to the body 2, and by the temporary coupling of the control panel 20, the coupling unit 50 is covered by the control panel 20. That is, the control panel 20 is temporarily coupled to the body 2 to cover the first lever 60 and the second lever 80. The pushing part 62 of the first lever 60 is provided as to be exposed to an outside the control panel 20.

After the control panel 20 is temporarily coupled to the body 2, the first lever 60 is moved from the first position 'P1' to the second position 'P2'. During the process as the above, the pressing part 82 of the second lever 80 is provided as to press an inner side of the control panel 20 toward the body 2 while interlocked with the operations of the first lever 60. The first lever 60 and the second lever 80 are provided as to be rotated in opposite directions with respect to each other, so that the pushing part 62 and the pressing part 82 operate in the same direction. A gap may be formed in between the control panel 20 and the body 2 due to the temporary coupling, and through the operations as the above, the gap is eliminated and then the control panel 20 may come into close contact with the body 2.

After then, the first lever 60 is fixed to the body 2 through the coupling hole 62a of the pushing part 62. As the pushing part 62 is fixed to the body 2, the second lever 60 is restricted to be prevented from moving. That is, a rotational force is delivered to the second driving force delivering part 86 through the first driving force delivering part 66, but the movement of the pressing part 82 disposed opposite to the second driving force delivering part 86 is limited by the body 2, and thus, the second lever 80 is structured not to be moved in an opposite manner.

The disassembling processes of the control panel 20 are provided to follow the reversal of the processes of the above.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:
1. A cooking appliance, comprising:
a body provided with a heating part;

a control panel detachably provided at the body; and
a coupling unit configured to allow the control panel to come into close contact with the body, wherein the coupling unit comprises:
a first lever rotatably coupled to the body and configured to receive an external force, the first lever comprising opposing first and second ends rotatable about a point therebetween; and
a second lever rotatably coupled to the body and comprising opposing first and second ends rotatable about a second point therebetween, the second end of the second lever configured to engage the control panel,
wherein the second end of the first lever interlocks with the first end of the second lever, such that moving the first end of the first lever toward the body rotates the second end of the second lever towards the body to thereby move the control panel into close contact with the body.

2. The cooking appliance of claim 1, wherein:
the first lever comprises a pushing part exposed to an outside of the control panel to receive the external force, and
the first lever moves between a first position at which the pushing part is spaced apart from the body and a second position at which the pushing part comes into close contact with the body after being rotated from the first position, and
when the first lever moves from the first position to the second position, the second lever presses the control panel toward the body while interlocked with the first lever.

3. The cooking appliance of claim 2, wherein:
when the first lever is at the second position, an operation of the second lever is restricted by the first lever in a state that the second level presses the control panel toward the body.

4. The cooking appliance of claim 2, wherein: when the first lever is at the second position, the second end of the second lever presses the control panel toward the body, while the first end of the second lever makes contact with the first lever such that an operation of the second lever is restricted.

5. The cooking appliance of claim 2, wherein: the pushing part is provided to be fixed to the body when the first lever is at the second position.

6. The cooking appliance of claim 1, wherein: the first lever comprises a pushing part disposed at the first end thereof to be exposed to an outside the control panel, the second lever comprises a pressing part at the second end thereof configured to press the control panel toward the body, and a direction of an external force being applied to the pushing part and a pressing direction of the pressing part are identical to each other.

7. The cooking appliance of claim 1, wherein:
the first lever further comprises:
a pushing part at the first end thereof exposed to an outside of the control panel;
a first rotating shaft between the first and second ends of the first lever; and
a first driving force delivering part provided at the second end thereof in between the control panel and the body, to deliver a driving force to the second lever when the pushing part is rotated toward the body about the first rotating shaft.

8. The cooking appliance of claim 7, wherein:
the second lever further comprises:

a second driving force delivery part at the first end thereof to receive a driving force through the first driving force delivering part;
a second rotating shaft between the first and second ends of the second lever; and
a pressing part at the second end thereof allowing the control panel to come into close contact with the body by being moved in a direction opposite to a movement direction of the second driving force delivering part by use of the second rotating shaft.

9. The cooking appliance of claim 8, wherein: the first rotating shaft and the second rotating shaft are parallel to each other.

10. The cooking appliance of claim 7, wherein:
the first driving force delivering part is formed to be thicker than the first lever adjacent to the first driving force delivering part.

11. The cooking appliance of claim 1, wherein:
the first lever and the second lever rotate in opposite directions with respect to each other.

12. The cooking appliance of claim 1, wherein: the first end of the first lever is bent so as to make a surface contact with the body.

13. The cooking appliance of claim 1, further comprising:
an opening through which food to be cooked is introduced or withdrawn, and a door to open and close the opening,
wherein the control panel is disposed at an upper side of the door.

14. The cooking appliance of claim 13, wherein:
the first end of the first lever is disposed to be exposed beyond a lower side of the control panel and covered by the door at the time of when the opening is closed by the door.

15. The cooking appliance of claim 1, further comprising:
a sealing member provided in between the body and the control panel while surrounding along the control panel.

16. The cooking appliance of claim 1, wherein:
the control panel comprises:
a panel body; and
a temporary coupling protrusion bentedly formed at the panel body to be parallel to an outer surface of a side of the control panel of the body,
wherein the second lever presses the temporary coupling protrusion.

17. A cooking appliance, comprising:
a body having an opening through which food to be cooked is introduced or withdrawn, and a door configured to open and close the opening;
a control panel detachably provided at the body; and
a coupling unit configured to allow the control panel to come into close contact with the body, wherein the coupling unit comprises
a pushing unit rotatably coupled to the body and comprising opposing first and second ends rotatable about a point therebetween, the first end thereof comprising a pushing part exposed to an outside of the control panel to receive an external force, the pushing unit configured to operate by the external force delivered to the pushing part; and
a pressing unit rotatably coupled to the body and comprising opposing first and second ends, wherein the first end thereof is interlocked with the second end of the pushing unit, and wherein the second end thereof is configured to press the control panel toward the body when the pushing part is moved toward the body.

18. The cooking appliance of claim 17, wherein: the pushing part is not exposed to an outside by the door at the time of when the door closes the opening.

19. The cooking appliance of claim 17, wherein:
the pushing unit moves between a first position at which the pushing part is spaced apart from the body and a second position at which the pushing part comes into close contact with the body after being rotated from the first position, and
when the pushing unit moves from the first position to the second position, the pressing unit presses the control panel toward the body while interlocked with the pushing unit.

20. The cooking appliance of claim 17, wherein: the pressing unit comprises a pressing part at the second end thereof to allow the control panel to be pressed toward the body, and the pushing part and the pressing part are moved in a same direction.

21. The cooking appliance of claim 17, wherein:
the pushing part further comprises a coupling hole coupled to the body.

22. A control panel assembling method of coupling a control panel to a body provided with a heating part, the control panel assembling method comprising:
providing a coupling unit comprising:
a first lever rotatably coupled to the body and configured to receive an external force, the first lever comprising opposing first and second ends rotatable about a point therebetween; and
a second lever rotatably coupled to the body and comprising opposing first and second ends rotatable about a second point therebetween, the second end of the second lever configured to engage the control panel, wherein the second end of the first lever interlocks with the first end of the second lever;
temporarily coupling the control panel to the body to cover the first lever and the second lever; and
pressing the first end of the first lever such that the second end of the second lever is moved into engagement with the control panel, thereby allowing the control panel to come into close contact with the body.

23. The control panel assembling method of claim 22, wherein: the first end of the first lever is exposed to an outside of the control panel.

24. The control panel assembling method of claim 22, wherein:
the first lever and the second lever are rotated in opposite directions with respect to each other.

* * * * *